United States Patent [19] [11] Patent Number: 5,277,228
Yamanashi [45] Date of Patent: Jan. 11, 1994

[54] WELDED PIPE WITH EXCELLENT CORROSION RESISTANCE INNER SURFACE

[75] Inventor: Hiroshi Yamanashi, Mishima, Japan

[73] Assignee: Usui Kokusai Sangyo Kaisha Limited, Shizuoka, Japan

[21] Appl. No.: 785,329

[22] Filed: Nov. 1, 1991

[30] Foreign Application Priority Data

Nov. 2, 1990 [JP] Japan .................. 2-298498

[51] Int. Cl.⁵ .................. F16L 9/00; F16L 9/14
[52] U.S. Cl. .................. 138/143; 138/140; 138/145; 138/171; 138/DIG. 6; 138/142
[58] Field of Search .................. 138/97, 98, 140, 141, 138/142, 143, 145, 146, 151, 152, 171, DIG. 6; 228/144, 149, 150, 263.13

[56] References Cited

U.S. PATENT DOCUMENTS

| 655,304 | 8/1900 | Midgley | 138/171 |
|---|---|---|---|
| 930,927 | 8/1909 | Berkstrasser | 138/143 |
| 1,144,106 | 6/1915 | Burgess | 138/DIG. 6 |
| 1,441,484 | 1/1923 | Conover | 138/171 |
| 1,650,321 | 11/1927 | Bundy | 138/142 |
| 1,712,090 | 5/1929 | Murphy | 138/143 |
| 1,930,191 | 10/1933 | Bundy | 138/171 |
| 2,054,939 | 9/1936 | Larson | 138/142 |
| 2,158,461 | 5/1939 | Koehring et al. | 138/142 |
| 2,198,331 | 4/1940 | Chyle | 138/142 |
| 2,209,290 | 7/1940 | Watts | 138/142 |
| 2,255,472 | 9/1941 | Quarnstrom | 138/142 |
| 2,300,850 | 11/1942 | Wolcott | 138/143 |
| 2,303,778 | 12/1942 | Wesley | 138/143 |
| 2,380,107 | 7/1945 | Hobrock | 138/171 |
| 2,866,480 | 12/1958 | Snively | 138/171 |
| 3,434,503 | 3/1969 | Knox | 138/171 |
| 3,598,156 | 8/1971 | Ulmer et al. | 138/143 |
| 3,678,567 | 7/1972 | Manilla et al. | 228/263.13 |
| 3,678,570 | 7/1972 | Panlonis et al. | 228/263.13 |
| 3,798,011 | 3/1974 | Sharp | 138/143 |
| 3,910,315 | 10/1975 | Norteman | 138/171 |
| 3,957,086 | 5/1976 | Gondek | 138/DIG. 6 |
| 4,366,971 | 1/1983 | Lula | 138/DIG. 6 |
| 4,747,225 | 5/1988 | Gstettner et al. | 228/263.13 |
| 4,885,215 | 12/1989 | Yoshioka et al. | 138/143 |

FOREIGN PATENT DOCUMENTS 49381  3/1988  Japan .................. 228/263.13

Primary Examiner—James E. Bryant, II
Attorney, Agent, or Firm—Nikaido, Marmelstein, Murray & Oram

[57] ABSTRACT

Disclosed are a welded pipe with an excellent corrosion resistance, having two plate layers on the inner surface thereof, and a method of manufacturing it. The inner surface is coated with the plate layers even on the bead part and other steel foundation-exposed parts. A first plate layer of at least one of Ni, Co and Ni- or Co-base alloys is formed on at least one surface of a steel strip, then a second plate layer made of a metal or alloy having a lower melting point than the metal or alloy of forming the first plate layer is formed over the first plate layer. The thus plated steel strip is formed into a pipe and then heat-treated to give a welded pipe having no exposed steel foundation. The welded pipe has excellent corrosion resistance and workability.

4 Claims, 1 Drawing Sheet

WELDED PIPE WITH EXCELLENT CORROSION RESISTANCE INNER SURFACE

FIELD OF THE INVENTION

The present invention relates to a method of manufacturing a welded pipe the inner surface of which has been plated with a metal or alloy and, more precisely, to such a welded pipe having an excellent corrosion resistance capable of preventing corrosion of the weld part (hereinafter referred to as "bead part") of the pipe.

BACKGROUND OF THE INVENTION

A thin steel pipe has heretofore been used as a fuel pipe for cars. As a pipe for lower gasoline, sour gasoline, alcohol and alcohol-mixed fuel, a welded pipe is used, which is manufactured by electrically nickel-plating a steel strip on at least one surface thereof for the purpose of improving the rust resistance of the inner surface of the pipe, shaping the thus nickel-plated steel strip into a pipe by roll forming with the nickel-plated surface being inside of the pipe, welding the butt-jointed part by electric resistance butt welding with electrode rolls or the like to form a welded pipe, and annealing it.

However, since the welded pipe having a nickel-plated layer on the inner surface thereof is manufactured by welding the butt-jointed part, after shaping into a pipe form, by electric resistance welding or the like, the bead part to be formed on the inner surface of the pipe causes discontinuity of the nickel-plated layer so that the steel foundation is locally exposed out (FIG. 3) or pin holes as existing in the nickel-plated layer remain as they are. Therefore, the part has a problem of being easily corroded by water as being in alcohol or alcohol-mixed fuel or by organic acids to be formed by oxidation of gasoline or by decomposition of alcohol.

The present invention is to overcome the above-mentioned problem, and the object of the present invention is to provide a welded pipe, which has an excellent corrosion resistance since even the bead part is coated with a plated metal layer and pin poles in the plated metal layer are also coated and which has an excellent workability for formation of terminals, and also to provide a method of manufacturing such a welded pipe.

The present inventor repeatedly studied for the purpose of overcoming the above-mentioned problems and of attaining the above-mentioned object and, as a result, has found that the object can be attained by forming a welded pipe from a steel strip as coated twice with a first plate layer of one of Ni, Co and Ni- or Co-base alloys and then with a second plate layer of a metal or alloy having a lower melting point than the metals or alloys of forming the first plate layer, or one selected from Sn, Sn-Zn, Ni-P and other low melting point metals and alloys. On the basis of the finding, he has attained the present invention.

Specifically, in accordance with the first embodiment of the present invention, there is provided a welded pipe having an excellent inner surface corrosion resistance, the inner surface of which at least except the bead part has a first plate layer of one of Ni, Co and Ni- or Co-base alloys and the inner surface of which including the bead part additionally has, on the first plate layer, a second plate layer of a metal or alloy having a lower melting point than the metal or alloy of forming the first plate layer. As the second embodiment of the present invention, there is provided a method of manufacturing a welded pipe having an excellent inner surface corrosion resistance, in which a first plate layer of one of Ni, Co and Ni- or Co base alloys is formed on at least one surface of a steel strip, then a second plate layer of a metal or alloy having a lower melting point than the metal or alloy of forming the first plate layer is formed on the first plate layer, and thereafter the thus plated steel strip is formed into a pipe with the plated surface being inside and then heat-treated.

Figure 1:
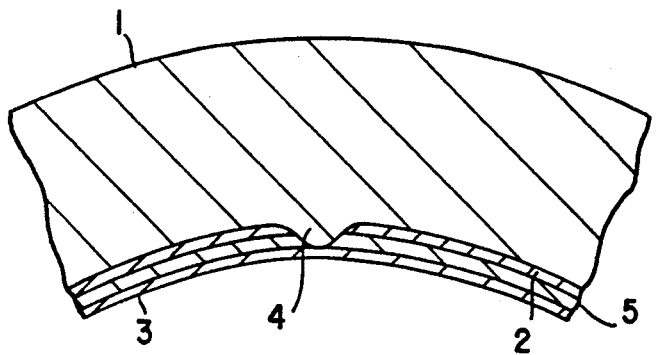
FIG. 1 is a partly enlarged cross-sectional view of showing a cross section of one embodiment of a welded pipe of the present invention as cut in the direction of the diameter of the pipe.

In the drawings, 1 is a steel strip, 2 is a first plate layer, 3 is a second plate layer, 4 is a bead part, 5 is a diffusion layer, and 6 is a subbing plate layer.

DETAILED DESCRIPTION OF THE INVENTION

As the steel strip for the present invention, anyone which is generally used in manufacturing ordinary fuel pipes for cars may be employed.

The first plate layer is formed on at least one surface of a steel strip with one of Ni, Co and Ni- or Co-base alloys by an ordinary electric or chemical plating method which is generally carried out for plating a steel strip, in such a way that the thickness of the plate layer formed may be from 0.5 to 10 $\mu$m. If the thickness of the first plate layer is less than 0.5 $\mu$m, the intended corrosion resistance could not be obtained. On the other hand, if it is more than 10 $\mu$m, the plated surface would be cracked and much cost is needed for forming such a thick plate layer without yielding any particular effect.

For the purpose of elevating the fixation of the first plate layer to the surface of a steel strip, a subbing plate layer may be made of a metal having a good affinity to the first metal layer, such as Ni, Co, Cu or the metal-base alloys, directly on the steel strip by a strike-plating method of the like, prior to formation of the first plate layer thereon. In the case, the thickness of the first plate layer is within the range of from 0.5 to 10 $\mu$m, inclusive of the thickness of the subbing plate layer; and the single thickness of only the subbing plate layer is desirably not more than 1 $\mu$m.

The second plate layer, which is a low melting point plate layer, is made of a single metal or an alloy having a lower melting point than the metal or alloy of forming the first plate layer, such as one selected from the group consisting of Sn, Sn-Zn, Sn-Ni, Ni-P, Ni-B or Ni-Z, by an electric or chemical plating method, and it is desirably formed on the first plate layer in a thickness of from 0.5 to 10 $\mu$m. If the thickness of the second plate layer is less than 0.5 $\mu$m the defects of the first plate layer, such as exposed steel foundation parts to be caused by the discontinuity in pin holes, cracks and the bead part of the first plate layer, could not be coated well so that the plated inner surface of the pipe could not have a sufficient corrosion resistance. On the other hand, however, if the thickness is more than 10 $\mu$m, the plated surface would cause cracks or deposits or it would be peeled off, and such a thick plate does not yield any particular favorable result. More preferably, the total thickness of the first plate layer and the second plate layer falls within the range of from 1 to 15 μm. This is because if the total thickness is less than 1 μm, the plated inner surface of the pipe could not display a sufficient corrosion resistance. However, if it is more than 15 μm, the plated surface would be cracked or peeled off in bending or pressing operation.

After plating, the plated steel strip is formed into a pipe by a conventional process comprising cutting the steel strip into a desired size, shaping it into a pipe by a roll-forming method with the plated surface being inside, welding the butt-jointed parts and heat-treating the welded pipe.

Heat-treatment is effected for the purpose of fusing and fluidizing the second plate layer so as to cover the defects of the first plate layer with removing the thermal influence by welding from the welded pipe. It is preferably effected at a temperature of from 600° to 1200° C. for a period of from 5 seconds to 15 minutes. If the temperature is lower than 600° C., fusion and fluidization of the second plate layer would be insufficient so that the defects of the first plate layer could not be covered sufficiently. On the other hand, if it is higher than 1200° C., the mother matrix of the foundation steel would be thermally deteriorated because of the growth of the crystal particles (to form coarse and large crystal particles) in the matrix. If the heating time is less than 5 seconds, fusion and fluidization of the second plate layer would be insufficient so that the defects of the first plate layer could not be covered sufficiently, and additionally, removal of the thermal influence by welding from the welded pipe would also be insufficient. On the other hand, if it is more than 15 minutes, the mother matrix of the foundation steel would be thermally deteriorated because of the growth of the crystal particles (to form coarse and large crystal particles) in the matrix, and additionally, the producibility would lower. More preferably, the heat-treatment is effected at a temperature of from 800° to 1200° C. for a period of from 10 seconds to 5 minutes.

In accordance with the present invention, a first plate layer of Ni or the like is formed on at least one surface of a steel strip in a determined thickness by an ordinary method, then a second plate layer such as an electric Sn-plated layer having a determined thickness is formed over the first plate layer, and thereafter the thus two-layer plated steel strip is cut into a determined size and formed into a pipe with the plated surface being inside by a roll forming method, then the butt-jointed parts are welded by an electric resistance welding method or high frequency welding method to form a welded pipe, and it is finally heat-treated with an atmospheric furnace of high frequency heating furnace to obtain a welded pipe having an excellent inner surface corrosion resistance. According to the procedure, the above-mentioned problem has been overcome by the present invention.

In general, in the manufacture process of forming a welded pipe, the plate layer is often locally dropped out in the bead part to be formed in the butt-welded part by electric resistance welding or high frequency welding. As opposed to this, in accordance with the manufacture process of the present invention, the second plate layer made of a metal or alloy having a lower melting point than the metal or alloy of forming the first metal layer as formed below the second plate layer is fused and fluidized by the subsequent heat-treatment so that the fused and fluidized metal from the second metal layer moves around the bead part because of the capillary action to form a low melting point plate layer (e.g., Sn plate layer) over the part. Even though the first plate layer (e.g., Ni plate layer) has pin holes or cracks, such pin holes or cracks would be covered also with the fused and fluidized metal from the second low melting point plate layer. Thus, the inner surface of the welded pipe of the present invention has two plate layers, one being a first plate layer such as an Ni plate layer and the other being a second plate layer of a low melting point metal or alloy as formed on the first plate layer. If desired, a diffusion layer may be formed between the first plate layer and the second plate layer. As a result, at least the bead part, pin holes and cracks of the first plate layer may well be covered with the second plate layer. Therefore, the thus plated inner surface of the welded pipe of the present invention is free from exposure of the steel foundation from the plated layer, and it has a protective barrier function against corrosion by water and organic acids to be in lower gasoline, sour gasoline, alcohol and alcohol-mixed fuel.

Figure 2:
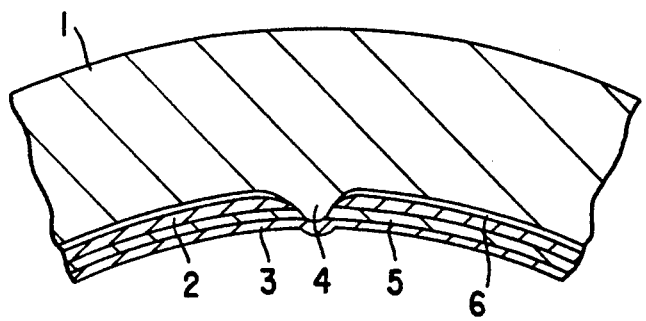
FIG. 2 is a partly enlarged cross-sectional view of showing a cross section of another embodiment of a welded pipe of the present invention as cut in the direction of the diameter of the pipe.
Figure 3:
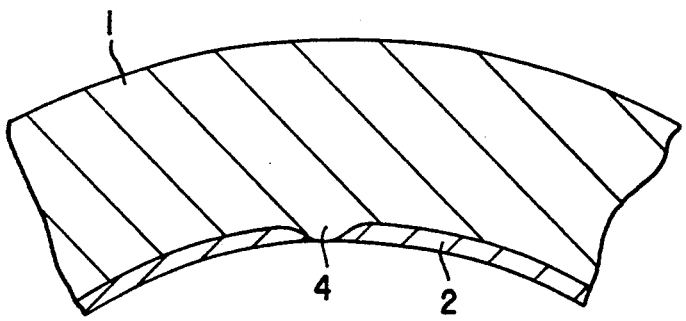
FIG. 3 is a partly enlarged cross-sectional view of showing a cross section of a conventional welded pipe as cut in the direction of the diameter of the pipe.

Next, the present invention will be explained in more detail by way of the following examples, which, however, are not intended to restrict the scope of the present invention. In these examples, FIGS. 1 to 3 are referred to. Briefly, FIG. 1 is a partly enlarged cross-sectional view of showing a cross section of one embodiment of a welded pipe of the present invention as cut in the direction of the diameter of the pipe. FIG. 2 is a partly enlarged cross-sectional view of showing a cross section of another embodiment of a welded pipe of the present invention as cut in the direction of the diameter of the pipe. FIG. 3 is a partly enlarged cross-sectional view of showing a cross section of a conventional welded pipe as cut in the direction of the diameter of the pipe.

EXAMPLE 1

FIG. 1 is referred to. An Ni plate layer having thickness of 3 μm was formed, as a first plate layer 2, on a steel strip (JIS G 3141 SPCC) 1 by electric plating, using a known Watt bath. Next, an Ni-P plate layer having a thickness of 2 μm was formed over the Ni plate layer, as a second plate layer 3, by chemical plating. The total thickness of the first layer and the second layer was 5 μm.

The steel strip thus coated with the two plate layers was cut into a size of the open width of a pipe, it was then formed into a pipe by roll forming, the burt edges were welded together by electric resistance welding to form a pipe having an outer diameter of 8 mm, then it was neat-treated at 900° C. for 30 seconds to form a welded pipe The pipe thus obtained was cut into two parts in the direction of the axis thereof. The test piece thus cut was masked except the surface to be tested, and this was subjected to a salt spray test based on the standard of JIS Z 2371. As a result, no red rust formed on the inner surface .of the tested pipe after 96 hours, and the pipe was admitted to have an excellent corrosion resistance. By microscopic observation of the cross section of the cut pipe piece, it was confirmed that the second plate layer 3 was formed on the bead part 4 and that a diffusion layer 5 was between the first plate layer 2 and the second plate layer 3. On the other hand, the pipe was subjected to a bending test where it was bent by a grooved roll to form a semi-circle with a radius of 20 mm and a performance test of the press-molding of the pipe end, whereupon the plated surface was neither cracked nor peeled off.

EXAMPLE 2

An Ni plate layer having a thickness of 5 μm was formed on a steel strip of the same kind as that of the steel strip used in Example 1, as the first plate layer, by the same electric plating method as in Example 1; and then an Sn plate layer having a thickness of 3 μm was formed over the first plate layer, as the second plate layer, by an electric plating method of using a known sulfate bath. The total thickness of the first layer and the second layer was 8 μm. The steel strip thus coated with two plate layers was formed into a pipe in the same manner as in Example 1 and then heat-treated at a temperature of 800° C. for 10 seconds to prepare a welded pipe.

The welded pipe thus obtained was subjected to the same salt spray test as in Example 1, whereupon no rust formed after 96 hours. By microscopic observation of the cross section of the bead part of the pipe after the test, it was admitted that the second plate layer surely covered the part and a diffused layer was presented between the first plate layer and the second plate layer. In the bending test and the performance test the plated surface of the pipe was neither cracked nor peeled off.

EXAMPLE 3

A Co plate layer having a thickness of 0.5 μm was formed on a steel strip of the same kind as that of the steel strip used in Example 1, as the first plate layer, by chemical plating of using a plating bath comprising 22 g/liter of $CoCl_2.7H_2O$, 105 g/liter of $N_2H_6Cl_2$ and 90 g/liter of $C_4H_4O_6Na_2.2H_2O$; and then an Ni-B plate layer having a thickness of 5 μm was formed over the first plate layer, as the second plate layer, by chemical plating. The total thickness of the first layer and the second layer was 5.5 μm. The steel strip thus coated with two plate layers was formed into a pipe in the same manner as in Example 1 and then heat-treated at a temperature of 1200° C. for 5 minutes to prepare a welded pipe.

The welded pipe thus obtained was subjected to the same salt spray test as in Example 1, whereupon no rust formed after 72 hours. By microscopic observation of the cross section of the bead part of the pipe after the test, it was admitted that the second plate layer surely covered the part and a diffused layer was presented between the first plate layer and the second plate layer. In the bending test and the performance test the plated surface of the pipe was neither cracked nor peeled off.

EXAMPLE 4

An Ni plate layer having a thickness of 8 μm was formed on a steel strip of the same kind as that of the steel strip used in Example 1, as the first plate layer, by the same electric plating method of using the same plating bath as in Example 1; and then an Sn-Ni plate layer having a thickness of 0.5 μm was formed over the first plate layer, as the second plate layer, by electric plating of using a plating bath comprising 0.28 g/liter of $SnCl_2.6H_2O$, 30 g/liter of $NiCl_2.6H_2O$, 200 g/liter of $K_4P_2O_7$, 20 g/liter of glycine and 5 ml/liter of concentrated aqueous ammonia. The total thickness of the first layer and the second layer was 8.5 μm. The steel strip thus coated with two plate layers was formed into a pipe in the same manner as in Example 1 and then heat-treated at a temperature of 1130° C. for 1 minute to prepare a welded pipe.

The welded pipe thus obtained was subjected to the same salt spray test as in Example 1, whereupon no rust formed after 72 hours. By microscopic observation of the cross section of the bead part of the pipe after the test, it was admitted that the second plate layer surely covered the part. In the bending test and the performance test the plated surface of the pipe was neither cracked nor peeled off.

EXAMPLE 5

An Ni-Co plate layer having a thickness of 0.5 μm was formed on a steel strip of the same kind as that of the steel strip used in Example 1, as the first plate layer, by electric plating of using a plating bath comprising 260 g/liter of $NiCl_2.6H_2O$, 14 g/liter of $CoCl_2.6H_2O$ and 15 g/liter of $H_3BO_3$; and then an Sn-Zn plate layer having a thickness of 0.5 μm was formed over the first plate layer, as the second plate layer, by electric plating of using a plating bath of "SZ-240" (manufactured by Dipsole Co.). The total thickness of the first layer and the second layer was 1 μm. The steel strip thus coated with two plate layers was formed into a pipe in the same manner as in Example 1 and then heat-treated at a temperature of 1000° C. for 2 minutes to prepare a welded pipe.

The welded pipe thus obtained was subjected to the same salt spray test as in Example 1, whereupon no rust formed after 48 hours. By microscopic observation of the cross section of the bead part of the pipe after the test, it was admitted that the second plate layer surely covered the part. In the bending test and the performance test the plated surface of the pipe was neither cracked nor peeled off.

EXAMPLE 6

A Co-Sn plate layer having a thickness of 10 μm was formed on a steel strip of the same kind as that of the steel strip used in Example 1, as the first plate layer, by electric plating of using a plating bath comprising 10 g/liter of $CoCl_2.6H_2O$, 45 g/liter of $Na_2Sn(OH)_6$ and 30 g/liter of aminocarboxylic acid; and then an Ni-Zn plate layer having a thickness of 5 μm was formed over the first plate layer, as the second plate layer, by electric plating of using a chloride bath. The total thickness of the first layer and the second layer was 15 μm. The steel strip thus coated with two plate layers was formed into a pipe in the same manner as in Example 1 and then heat-treated at a temperature of 800° C. for 30 seconds to prepare a welded pipe.

The welded pipe thus obtained was subjected to the same salt spray test as in Example 1, whereupon no rust formed after 72 hours. By microscopic observation of the cross section of the bead part of the pipe after the test, it was admitted that the second plate layer surely covered the part and diffused layer was presented between the first plate layer ad the second plate layer. In the bending test and the performance test, the plated surface of the pipe was neither cracked nor

EXAMPLE 7

An Ni-B plate layer having a thickness of 0.5 μm was formed on a steel strip of the same kind as that of the steel strip used in Example 1, as the first plate layer, by the same chemical plating method as in Example 3 of forming the second plate layer; and then an Sn-Ni plate layer having a thickness of 10 μm was formed over the first Ni-B plate layer, as the second plate layer, by the same electric plating method as in Example 4 of forming the second plate layer The total thickness of the first layer and the second layer was 10.5 μm. The steel strip thus coated with two plate layers was formed into a pipe in the same manner as in Example 1 and then heat treated at a temperature of 1130° C. for 3 minutes to prepare a welded pipe.

The welded pipe thus obtained was subjected to the same salt spray test as in Example 1, whereupon no rust formed after 72 hours. By microscopic observation of the cross section of the bead part of the pipe after the test, it was admitted that the second plate layer surely covered the part. In the bending test, the plated surface of the pipe was neither cracked nor peeled off.

EXAMPLE 8

FIG. 2 is referred to. A strike Ni plate layer having a thickness of 0.3 μm was formed on a steel strip 1 of the same kind as that of the steel strip used in Example 1, as a subbing plate layer 6, by electric plating of using a known Wood bath; then a Co plate layer having a thickness of 5 μm was formed over the subbing Ni plate layer, as a first plate layer 2, by the same electric plating method as in Example 3 of forming the first plate layer; and thereafter an Ni-B plate layer having a thickness of 0.5 μm was formed over the first Co plate layer, as a second plate layer 3, by the same plating method as in Example 3 of forming the second plate layer. The total thickness of the subbing layer, the first layer and the second layer was 5.8 μm. The steel strip thus coated with one subbing layer and two plate layers was formed into a pipe in the same manner as in Example 1 and then heat-treated at a temperature of 900° C. for 3 minutes to prepare a welded pipe.

The welded pipe thus obtained was subjected to the same salt spray test as in Example 1, whereupon no rust formed after 72 hours. By microscopic observation of the cross section of the bead part of the pipe after the test, it was admitted that the second plate layer surely covered the part. In the bending test and the performance test, the plated surface of the pipe was neither cracked nor peeled off.

EXAMPLE 9

A strike Cu plate layer having a thickness of 0.5 μm was formed on a steel strip of the same kind as that of the steel strip used in Example 1, as a subbing plate layer 6, by electric plating of using a known copper cyanide bath; then an Ni plate layer having a thickness of 4 μm was formed over the subbing Cu plate layer, as the first plate layer, by the same electric plating method as in Example 1 of forming the first plate layer; and thereafter an Ni-P plate layer having a thickness of 10 μm was formed over the first Ni plate layer, as the second plate layer, by the same chemical plating method as in Example 1 of forming the second plate layer. The total thickness of the subbing layer, the first layer and the second layer was 14.5 μm. The steel strip thus coated with one subbing layer and two plate layers was formed into a pipe in the same manner as in Example 1 and then heat treated at a temperature of 850° C. for 30 seconds to prepare a welded pipe.

The welded pipe thus obtained was subjected to the same salt spray test as in Example 1, whereupon no rust formed after 96 hours. By microscopic observation of the cross section of the bead part of the pipe after the test, it was admitted that the second plate layer surely covered the part. In the bending test and the performance test, the plated surface of the pipe was neither cracked nor peeled off.

COMPARATIVE EXAMPLE 1

FIG. 3 is referred to. An Ni plate layer 2 having a thickness of 3 μm only was formed on a steel strip 1 of the same kind as that of the steel strip used in Example 1, in the same manner as in Example 2 of forming the first Ni plate layer. The steel strip thus coated with only one plate layer was formed into a pipe in the same manner as in Example 1 and then heat-treated at a temperature of 900° C. for 30 seconds to prepare a welded pipe.

The welded pipe thus obtained was subjected to the same salt spray test as in Example 1, whereupon the bead part rusted in a half-hour. By microscopic observation of the cross section of the bead part of the pipe after the test, it was confirmed that the Ni plate layer dropped off from the part.

COMPARATIVE EXAMPLE 2

An Ni plate layer having a thickness of 0.2 μm was formed on a steel strip of the same kind as that of the steel strip used in Example 1, as the first plate layer, by the same electric plating method as in Example 1 of forming the first plate layer; and then an Sn plate layer having a thickness of 15 μm was formed over the first Ni plate layer, as the second plate layer, by the same electric plating method as in Example 2 of forming the second plate layer. The total thickness of the first layer and the second layer was 15.2 μm. The steel strip thus coated with two plate layers was formed into a pipe in the same manner as in Example 1 and then heat-treated at a temperature of 1130° C. for 3 minutes to prepare a welded pipe.

The welded pipe thus obtained was subjected to the same salt spray test as in Example 1, whereupon no rust formed after 48 hours. However, as a result of the bending test and the performance test of the pipe, the plated surface was peeled off. In the example, since the total thickness of the two plate layers coated was over the preferred upper limit of 15 μm, the welded pipe was not practicable but was disadvantageously high-priced.

COMPARATIVE EXAMPLE 3

A Co-Sn plate layer having a thickness of 5 μm was formed on a steel strip of the same kind as that of the steel strip used in Example 1, as the first plate layer, by the same electric plating method as in Example 6 of forming the first plate layer; and then an Ni-B plate layer having a thickness of 15 μm was formed over the first Co-Sn plate layer, as the second plate layer, by the same plating method as in Example 3 of forming the second plate layer. The total thickness of the first layer and the second layer was 20 μm. The steel strip thus coated with two plate layers was formed into a pipe in the same manner as in Example 1 and then heat-treated at a temperature of 1000° C. for 5 minutes to prepare a welded pipe.

The welded pipe thus obtained was subjected to the same salt spray test as in Example 1, whereupon no rust formed after 48 hours. However, as a result of the bending test and the performance test of the pipe, the plated surface was peeled off.

COMPARATIVE EXAMPLE 4

An Ni plate layer having a thickness of 15 μm was formed on a steel strip of the same kind as that of the steel strip used in Example 1, as the first plate layer, by the same electric plating method as in Example 1 of forming the first plate layer; and then an Ni-P plate layer having a thickness of 15 μm was formed over the first Ni plate layer, as the second plate layer, by the same chemical plating method as in Example 1 of forming the second plate layer. The total thickness of the first layer and the second layer was 30 μm. The steel strip thus coated with two plate layers was formed into a pipe in the same manner as in Example 1 and then heat-treated at a temperature of 850° C. for 30 seconds to prepare a welded pipe.

The welded pipe thus obtained was subjected to the same salt spray test as in Example 1, whereupon no rust formed after 48 hours. However, as a result of the bending test and the performance test of the pipe, the plated surface was peeled off.

In accordance with the present invention, there is provided a welded pipe, the inner surface of which has been coated with two plate layers of a first plate layer and a second plate layer in order, the second plate layer being made of a metal or alloy having a lower melting point than the metal or alloy of forming the first plate layer. Accordingly, the inner surface of the welded pipe of the present invention is free from exposure of the background steel foundation and is therefore free from cracks, pin holes of deposits. The plate layers of coating the inner surface of the welded pipe of the present invention are hardly peeled off and therefore have an excellent corrosion resistance. Additionally, the welded pipe of the present invention has excellent workability for bending or formation of terminals. The industrial advantage of the present invention is obvious.

While the invention has been described in detail and with reference to specific embodiments thereof, it will be apparent to one skilled in the art that various changes and modifications can be made therein without departing from the spirit and scope thereof.

What is claimed is:

1. A welded pipe, having excellent corrosion resistance at least on an inner surface thereof, comprising: metal strip welded together to form said pipe comprising a welding bead; a first plated layer, comprising Ni, Co and Ni- or Co-base alloys, disposed on the inner surface of said welded metal strip; and a second plated layer, comprising a single metal or alloy having a lower melting point than said first layer, disposed over said first layer and substantially covering said bead.

2. The welded pipe having an excellent inner surface corrosion resistance as claimed in claim 1, further including a diffusion layer between said first plated layer and said second plated layer.

3. The welded pipe having an excellent inner surface corrosion resistance as claimed in claim 1 or 2, in which the second plated layer comprised at least one of sn, Sn-Zn, Sn-Ni, Ni-P, Ni-B and Ni-Zn.

4. The welded pipe having an excellent inner surface corrosion resistance as claimed in any one of claims 1 to 3, further comprising a subbing plate layer between said inner surface and said first plated layer.

* * * * *